(12) United States Patent
Lee et al.

(10) Patent No.: US 7,006,178 B2
(45) Date of Patent: Feb. 28, 2006

(54) ONE DROP FILL LCD PANEL HAVING LIGHT-SHIELDING PATTERN WITH FIRST AND SECOND METAL PATTERNS

(75) Inventors: Yu-Chi Lee, Taipei (TW); Po-Hsiu Shih, Taipei Hsien (TW); Hong-Tian Yu, Tao-Yuan Hsien (TW); Hung-Jen Chu, Nan-Tou Hsien (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 112 days.

(21) Appl. No.: 10/707,416

(22) Filed: Dec. 12, 2003

(65) Prior Publication Data

US 2005/0052606 A1    Mar. 10, 2005

(30) Foreign Application Priority Data

Sep. 8, 2003    (TW) .............................. 92124752 U (51) Int. Cl.
*G02F 1/13333*  (2006.01)
*G02F 1/1339*   (2006.01)
*G02F 1/13*     (2006.01)

(52) U.S. Cl. ...................... 349/110; 349/153; 349/187; 349/190

(58) Field of Classification Search ................ 349/110, 349/111, 153, 187, 189, 190
See application file for complete search history.

(56) References Cited

U.S. PATENT DOCUMENTS

| | | | |
|---|---|---|---|
| 2002/0167634 A1 * | 11/2002 | Watanabe et al. ........... | 349/153 |
| 2004/0183992 A1 * | 9/2004 | Lee et al. ................... | 349/187 |
| 2005/0062910 A1 * | 3/2005 | Chu et al. ................... | 349/110 |

FOREIGN PATENT DOCUMENTS

| JP | 03-015822 | * | 1/1991 |
|----|-----------|---|--------|
| JP | 07-098459 |   | 4/1995 |
| JP | 09-015610 |   | 1/1997 |
| JP | 10-123544 | * | 5/1998 |

* cited by examiner

*Primary Examiner*—Tarifur R. Chowdhury
(74) *Attorney, Agent, or Firm*—Winston Hsu (57) ABSTRACT

A one drop fill (ODF) liquid crystal display panel has a CF substrate, a TFT substrate, and a liquid crystal layer positioned between the CF substrate and the TFT substrate. The TFT substrate further has a pixel array region positioned in the center part of the TFT substrate, a sealant region position in the periphery region of the TFT substrate, a light-shielding pattern positioned on the sealant region, and a sealant pattern positioned corresponding to the sealant region between the CF substrate and the TFT substrate for assembling the two substrates.

11 Claims, 10 Drawing Sheets

ONE DROP FILL LCD PANEL HAVING LIGHT-SHIELDING PATTERN WITH FIRST AND SECOND METAL PATTERNS

BACKGROUND OF INVENTION

1. Field of the Invention

The present invention relates to an LCD panel, and more particularly, to a one drop fill (ODF) LCD panel having a light-shielding pattern capable of preventing light leakage through a peripheral region of the LCD panel.

2. Description of the Prior Art

LCD displays have been widely applied to a variety of information products, such as notebook computers and PDAs, since they have advantages of tiny size, low power consumption, and low radiation emission.

Normally, an LCD panel includes a color filter substrate (CF substrate), a thin film transistor substrate (TFT substrate), and a liquid crystal layer positioned between the CF substrate and the TFT substrate. The TFT substrate further includes a plurality of pixel array regions arranged in arrays on the surface, each pixel array region including a TFT and a pixel electrode for controlling spinning angles of liquid crystal molecules such that each pixel can generate different colors and gray scales.

In general, LCD panels can be divided into two types according to methods of filling liquid crystal molecules: vacuum fill LCD and one drop fill (ODF) LCD. In a vacuum fill LCD, the CF substrate and the TFT substrate are combined together with a sealant, and only a hole is kept. Then, liquid crystal molecules are slowly injected into the space between the CF substrate and the TFT substrate by capillarity action. However, this requires a lot of time (ex: several days for assembling a large size LCD) and a great amount of liquid crystal molecules. Therefore, the vacuum fill method is usually applied to fill only small panels with liquid crystal molecules. In an ODF LCD, first, a sealant layer is pasted onto the bordering part of the TFT substrate. Then, liquid crystal molecules are dropped on the central part of a pixel region, and the CF substrate and the TFT substrate are affixed. Finally, an ultraviolet beam is utilized to irradiate the sealant for hardening the sealant such that the CF substrate and the TFT substrate are tightly combined together. In comparison with vacuum fill method, ODF method is more effective (it takes only a few hours to fill a large size LCD), and needs fewer liquid crystal molecules. Hence, at present, the ODF method is normally applied to fill large LCD panels with liquid crystal molecules.

Figure 1:
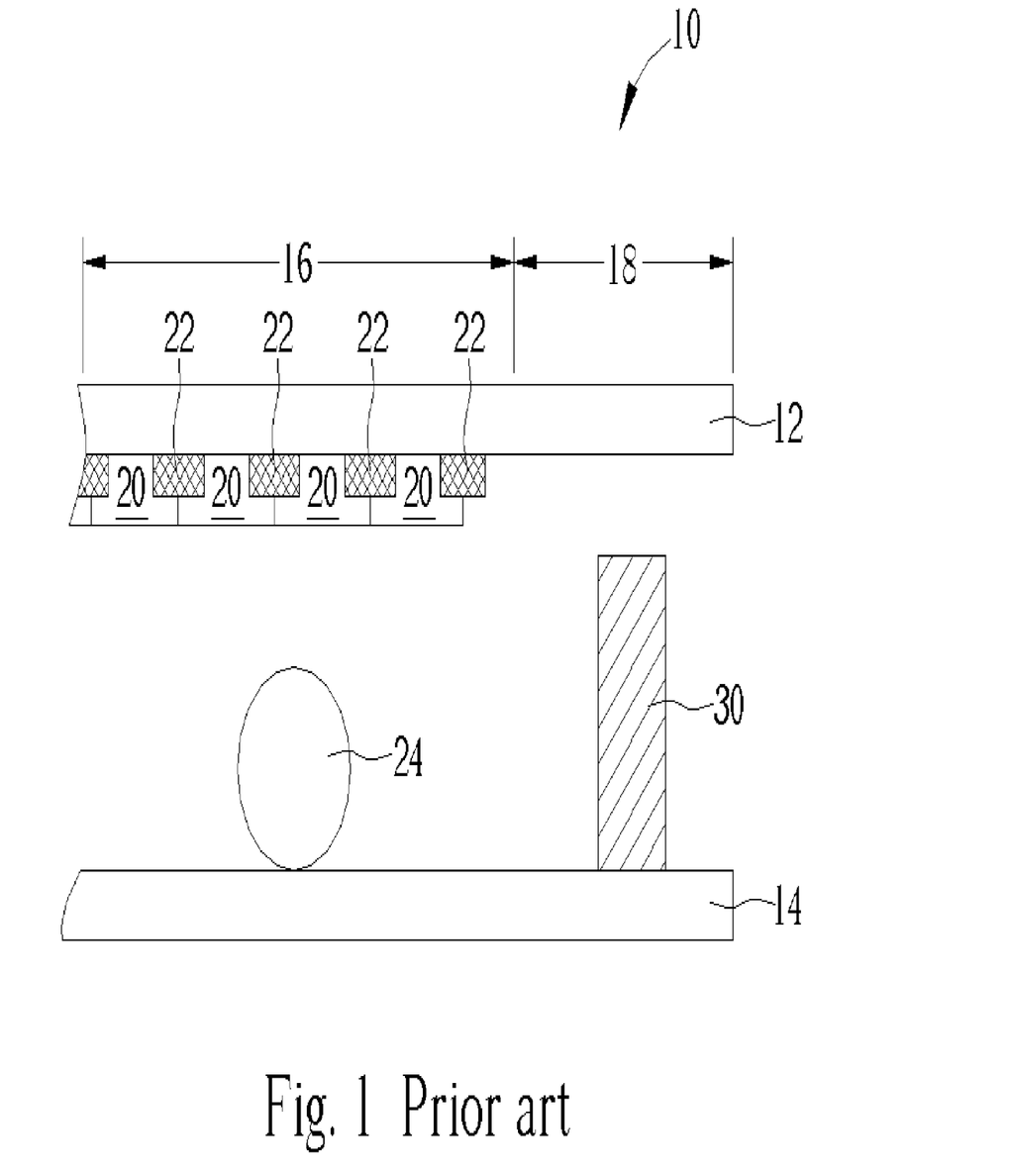
FIG. 1 is a schematic diagram of a conventional ODF LCD panel before substrates are combined together.

Please refer to FIG. 1. FIG. 1 is a schematic diagram of a conventional ODF LCD panel 10 before substrates are combined together. As shown in FIG. 1, the ODF LCD panel 10 comprises a CF substrate 12, and a TFT substrate 14 positioned in parallel with the CF substrate 12. The ODF LCD panel 10 includes a pixel array region 16 and a sealant region 18. The pixel array region 16 further comprises a plurality of color filters 20 positioned on the surface of the CF substrate 12 corresponding to the TFT substrate 14, a plurality of black matrices 22 positioned between any two neighboring color filters 20, and at least a liquid crystal drop 24 dropped onto the surface of the TFT substrate 14.

Figure 2:
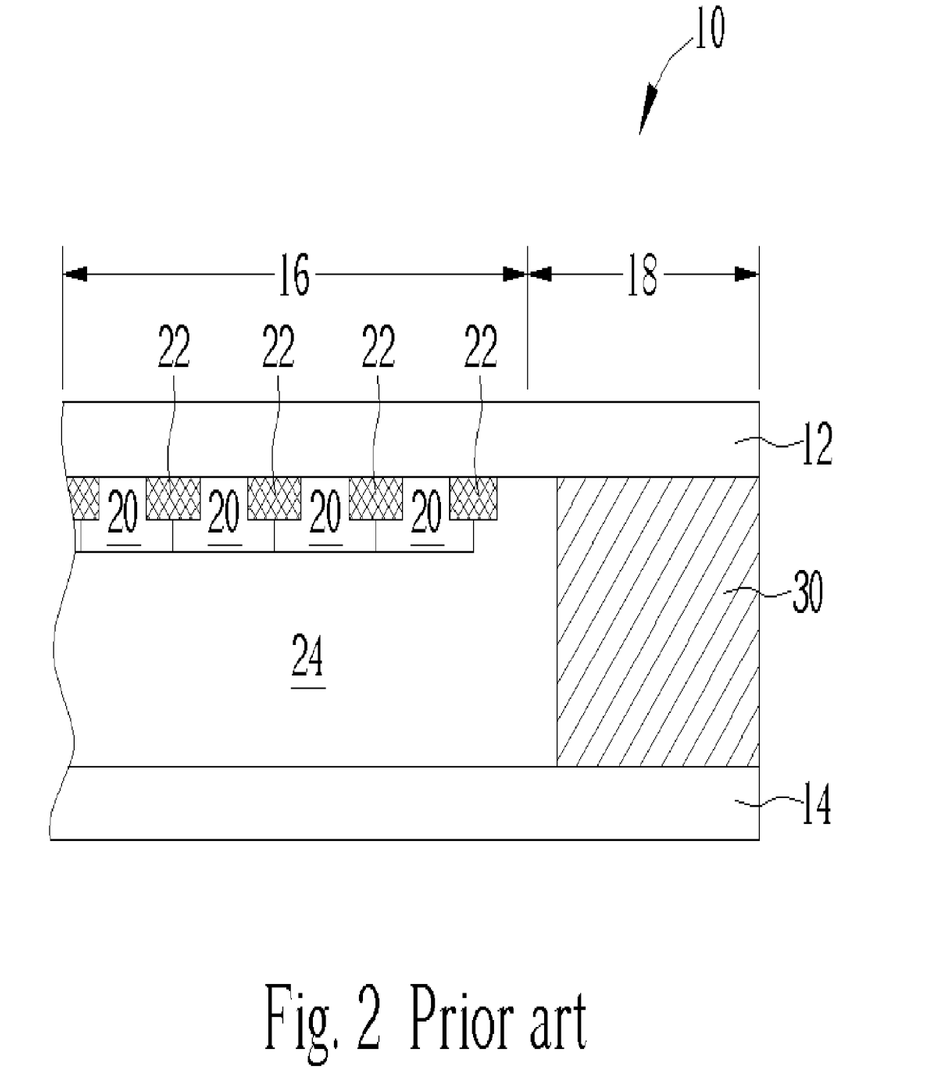
FIG. 2 is a schematic diagram of the conventional ODF LCD panel shown in FIG. 1 after the CF substrate and the TFT substrate are combined.

Please refer to FIG. 2. FIG. 2 is a schematic diagram of the conventional ODF LCD panel 10 after the CF substrate 12 and the TFT substrate 14 are combined. As shown in FIG. 2, the CF substrate 12 and the TFT substrate 14 are connected by a sealant 30 such that the liquid crystal drop 24 is equally spread in the pixel array region 16 between the CF substrate 12 and the TFT substrate 14. However, since the sealant is a photocuring material, it has to be irradiated by an ultraviolet beam to become completely strengthened so that the CF substrate 12 and the TFT substrate 14 are perfectly affixed and combined together. In addition, if the sealant 30 is not totally hardened, the sealant will react with the liquid crystal molecules so that the efficiency of the liquid crystal molecules will be deteriorated.

Figure 3:
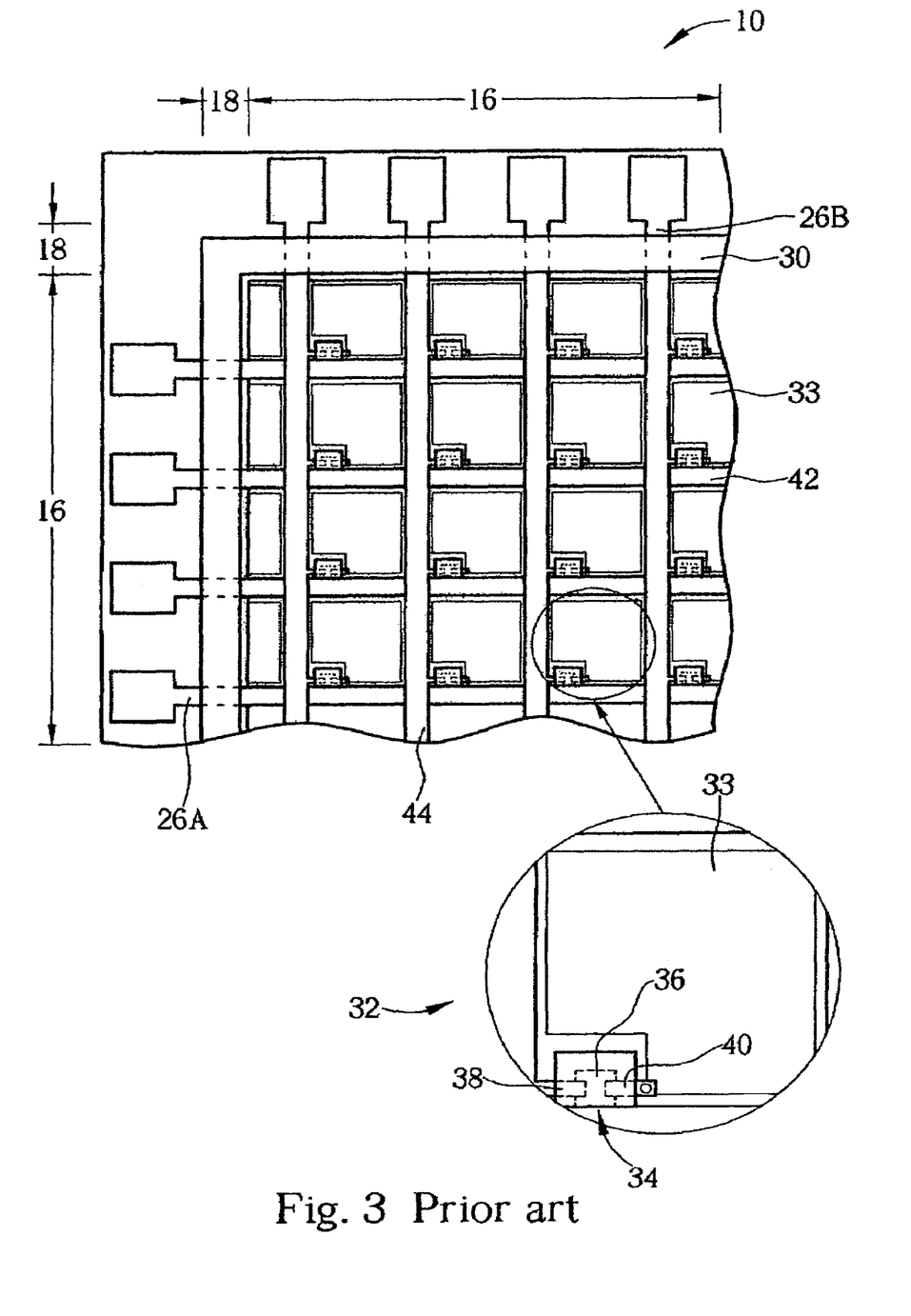
FIG. 3 is a top view of the conventional ODF LCD panel.

Please refer to FIG. 3. FIG. 3 is a top view of the conventional ODF LCD panel 10. As shown in FIG. 3, the pixel array region 16 of the ODF LCD panel 10 comprises a plurality of pixels arranged in arrays, and each pixel includes a thin film transistor (TFT) 34 for controlling switching of each pixel 32. Each pixel 34 includes a gate 36 electrically connected to a scan line 42, a drain electrically connected to a data line 44, and a source 40 electrically connected to a pixel electrode 33. On the other hand, the sealant 18 comprises a plurality of metal conducting wires 26A and 26B. The metal conducting wires 26A and 26B are respectively connected to each scan line 42 and each data line 44 at one end, and are respectively connected to gate driving ICs (not shown) and source driving ICs (not shown) at the other end. In this case, voltage signals of each IC (not shown) can be delivered to the gate 36 and the source 40 of each TFT 34.

As above mentioned, after the ODF LCD panel 10 is combined together, the sealant 30 needs to be irradiated by an ultraviolet beam for completely hardening the sealant 30, so that the CF substrate 12 and the TFT substrate 14 become tightly fixed together. Besides, in this case liquid crystal molecules will not react with the sealant 30 so that the function of liquid crystal is not influenced. However, when the ultraviolet beam irradiates the sealant 30 from the front side of the CF substrate 12, the light source provided by the back light module (not shown) will pass through the gap between the metal conducting wires 26A and 26B in the sealant region 18 so that light leakage occurs in the peripheral region of the ODF LCD panel 10.

To avoid this problem, the ultraviolet beam is then irradiated form the back side of the TFT substrate 14 for hardening the sealant 30, and a black matrix layer (not shown) is installed on the surface of the CF substrate 12 corresponding to the sealant region 18 for preventing from light leakage in conventional technologies. As shown in FIG. 3, however, since the metal conducting wires 26A and 26B are not transparent, the sealant 30 cannot be completely hardened. In this case, display quality is deteriorated.

Therefore, ensuring the sealant of ODF LCD panel is completely irradiated by the ultraviolet beam to avoid light leakage at the bordering part of ODF LCD panel is a key topic for study in designing ODF LCD panels.

SUMMARY OF INVENTION

It is therefore a primary objective of the present invention to provide an ODF LCD panel capable of solving the light leakage and incomplete hardening problems of conventional ODF LCD panels.

According to the present invention, an ODF LCD panel is disclosed. The ODF LCD panel comprises a thin film transistor (TFT) substrate and a color filter (CF) substrate parallel to each other. The TFT substrate includes a pixel array region in the central part, a sealant region in the bordering part, a light-shielding pattern positioned on the surface of the sealant region, a sealant pattern corresponding to the sealant region between the CF substrate and the TFT substrate, and a liquid crystal layer positioned between the CF substrate and the TFT substrate.

It is an advantage of the present invention that the light-shielding pattern is capable of preventing from light leakage in the peripheral region of the ODF LCD panel.

These and other objects of the present invention will be apparent to those of ordinary skill in the art after having read the following detailed description of the preferred embodiment that is illustrated in the various figures and drawings.

DETAILED DESCRIPTION

Figure 4:
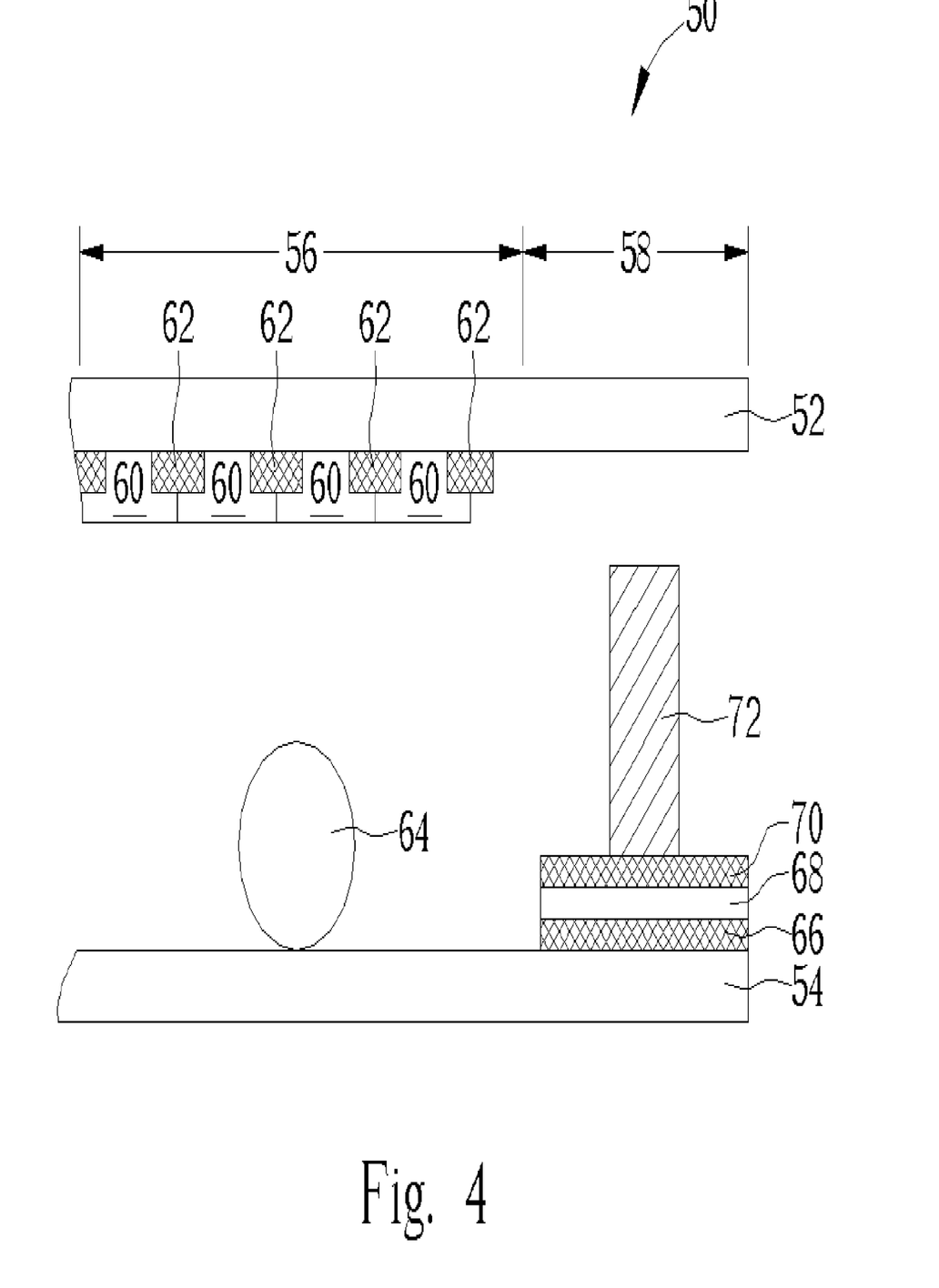
FIG. 4 is a schematic diagram of an ODF LCD panel of the present invention before substrates are combined together.

Please refer to FIG. 4. FIG. 4 is a schematic diagram of an ODF LCD panel 50 of the present invention before substrates are combined together. As shown in FIG. 4, the ODF LCD panel 50 comprises a CF substrate 52 and a TFT substrate 54 positioned parallel with the CF substrate 52. In addition, the ODF LCD panel 50 is divided into a pixel array region 56 and a sealant region 58. The pixel array region 56 includes a plurality of color filters 60 positioned on the surface of the CF substrate 52 corresponding to the TFT substrate 54, a plurality of black matrices 62 positioned between neighboring color filters 60, and at least a liquid crystal drop 64 dropped on the surface of the TFT substrate 54. The sealant region 58 includes a first metal pattern 66 positioned on the surface of the TFT substrate 54, an insulating layer 68 positioned on the first metal pattern 66, a second metal pattern 70 positioned on the insulating layer 68, and a sealant 72 pasted on the surface of the second metal pattern 70 for adhering the CF substrate 52 and the TFT substrate 54. It is worth noting that liquid crystal drop 64 can also be dropped on the surface of the CF substrate 52.

Figure 5:
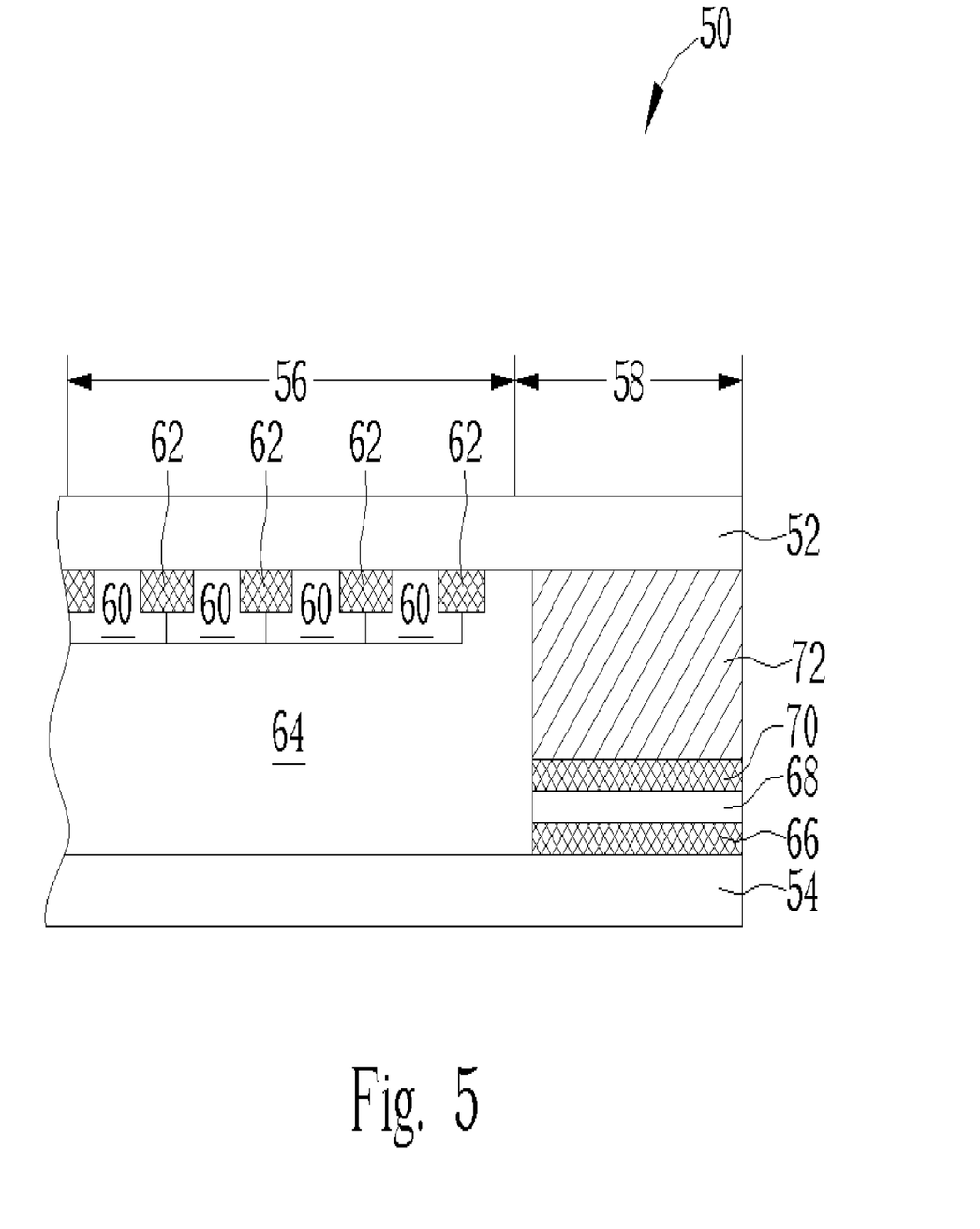
FIG. 5 is a schematic diagram of the ODF LCD panel shown in FIG. 4 after the CF substrate and the TFT substrate are combined.

Please refer to FIG. 5. FIG. 5 is a schematic diagram of the ODF LCD panel 50 shown in FIG. 4 after the CF substrate 52 and the TFT substrate 54 are combined. As shown in FIG. 5, the CF substrate 52 is placed on the TFT substrate 54. The CF substrate 52 squeezes the liquid crystal drop 64 due to atmospheric pressure such that the liquid crystal drop 64 is equally spread in the pixel region 56 and the CF substrate 52 and the TFT substrate 54 are combined together. In addition, since the sealant 72 is a photocuring material, it has to be irradiated by an ultraviolet beam for being completely hardened so that the CF substrate 52 and the TFT substrate 54 become adhered and fixed together.

It is worth noting that the sealant 72 is disposed in the sealant region 58 of the TFT substrate 54 in this embodiment. However, the sealant 72 can be also disposed on the surface of the CF substrate 52 corresponding to the sealant region 58 for achieving the same effect.

Figure 6:
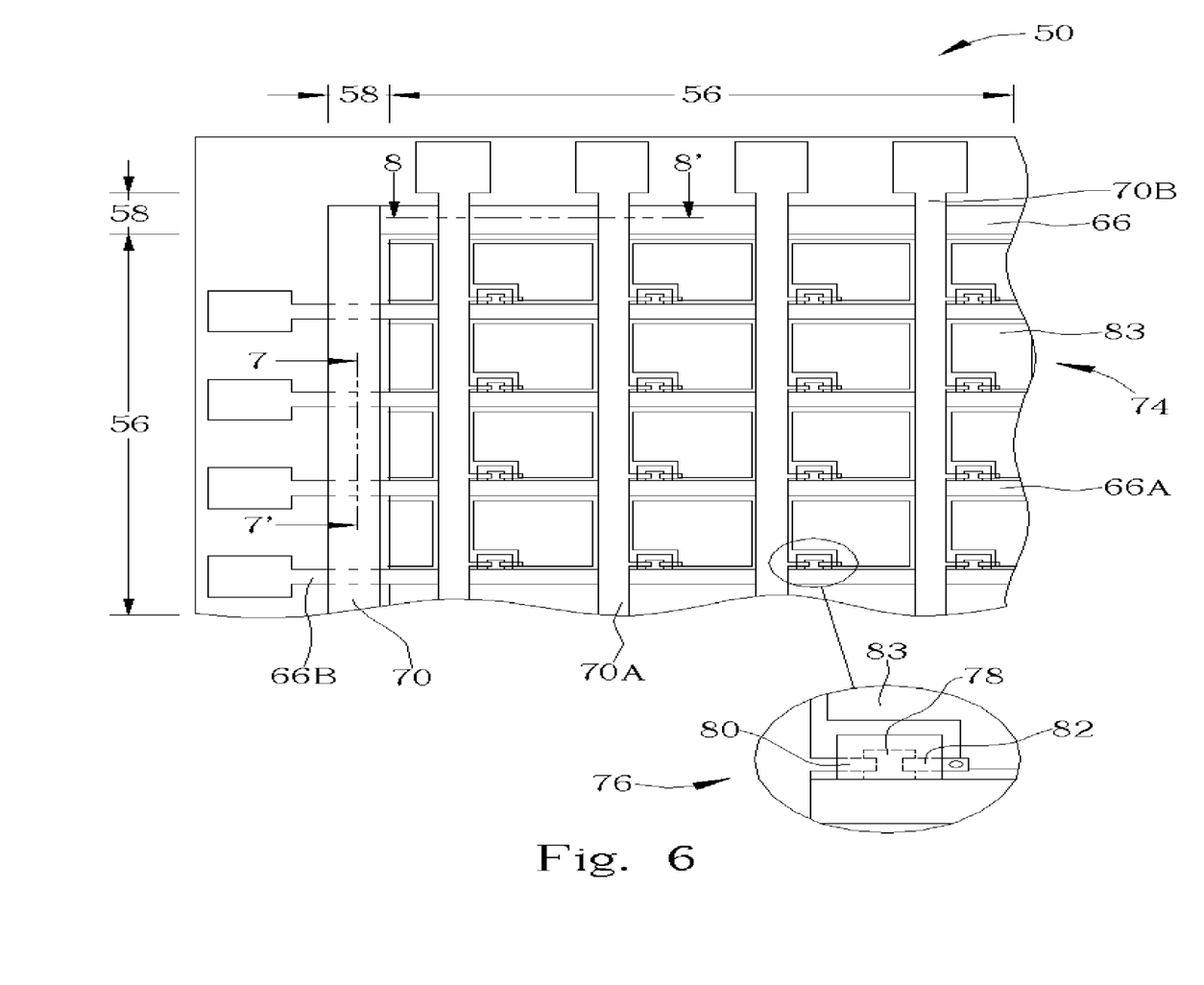
FIG. 6 is a top view of the ODF LCD panel of the present invention.
Figure 7:
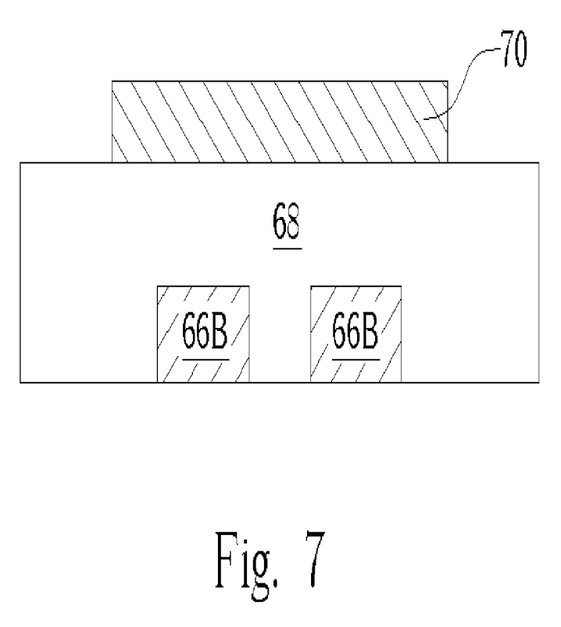
FIG. 7 is a cross section diagram of the ODF LCD panel along a section line 7—7 of FIG. 6.

For more details of the metal pattern design in the sealant region 58, please refer to FIG. 6 and FIG. 7. FIG. 6 is a top view of the ODF LCD panel 50 of the present invention. FIG. 7 is a cross section diagram of the ODF LCD panel 50 along a section line 7–7" of FIG. 6. As shown in FIG. 6, the pixel array region 56 includes a plurality of pixels 74 arranged in arrays. Each pixel 74 includes a thin film transistor (TFT) 76 as a switch. Each TFT 76 includes a gate 78 electrically connected to a scan line 66A, a drain 80 electrically connected to a data line 70A, and a source 82 electrically connected to a pixel electrode 83. In addition, the sealant region 58 further comprises a plurality of scan lines 66A for connecting the gate 78 of the TFT 76, and a plurality of data lines 70A for transferring voltage signals to the pixel electrode 83 of each pixel 74.

It is worth noting that the first metal pattern 66, the scan lines 66A, and the gate 78 of each TFT 76 are coplanar and formed simultaneously in the same deposition and photo-etching processes. In addition, the second metal pattern 70 and the data lines 70A are coplanar and formed in the same deposition and photo-etching processes. Thus, the present invention can be implemented in any standard LCD manufacturing process without adding any steps. In addition, since the primary objective of the present invention is to solve the light leakage and the incomplete sealant hardening problems of the conventional ODF LCD panel, a light-shielding pattern larger than the sealant pattern is therefore formed in the sealant region 58 during the processes of forming the scan lines 66A and the data lines 70A.

As shown in FIG. 6 and FIG. 7, the sealant region 58 includes a first metal pattern 66B. The first metal pattern 66B is connected to the scan lines 66A at one end, and connected to a gate driving IC (not shown) in the other end so that the voltage signal provided by the gate driving IC (not shown) is delivered to each scan line 66A. However, the first metal pattern 66B is not capable of shielding light, thus a second metal pattern 70 is formed on the insulating layer 68 for preventing from light leakage through the first metal pattern 66B. In this case, when assembling the ODF LCD panel 50, the sealant 72 is irradiated by the ultraviolet beam from the front side of the CF substrate 52 so that the sealant 72 is completely hardened. Thus, the light leakage problem will not happen in the peripheral region since no light can pass through the sealant region 58.

Figure 8:
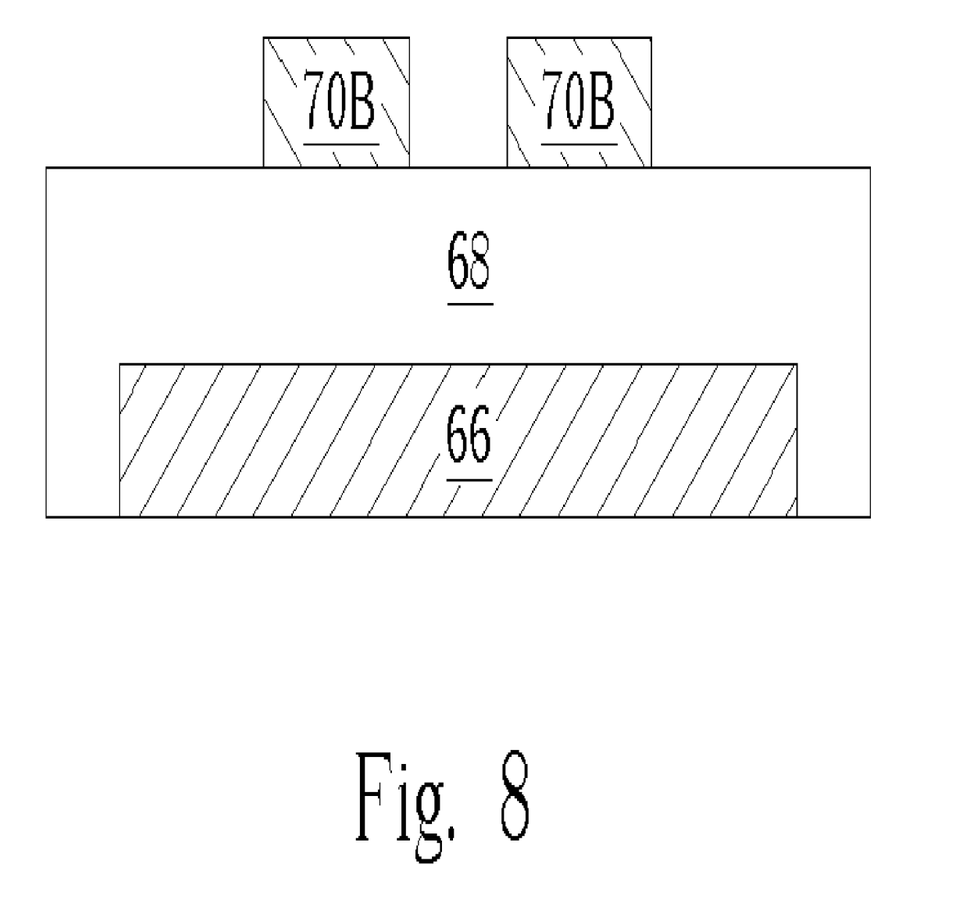
FIG. 8 is a cross section diagram of the ODF LCD panel along a section line 8—8 of FIG. 6.

Please refer to FIG. 8. FIG. 8 is a cross section diagram of the ODF LCD panel 50 shown in FIG. 6 along a section line 8-8. As shown in FIG. 6 and FIG. 8, the sealant region 58 includes a second metal pattern 70B. The second metal pattern 70B is connected to the data lines 70A, and connected to a source driving IC (not shown) so that the voltage signal provided by the source driving IC (not shown) is delivered to each data line 70A. However, the second metal pattern 70B is not capable of shielding light, thus a first metal pattern 66 is formed under the second metal pattern 70B in advance for preventing from light leakage through the second metal pattern 70B. Following that, an insulating layer 68 is formed between the first metal pattern 66 and the second metal pattern 70B. In this case, when assembling the ODF LCD panel 50, the sealant 72 is irradiated by the ultraviolet beam from the front side of the CF substrate 52 so that the sealant 72 is completely hardened. Thus, the light leakage problem will not happen in the peripheral region since no light can pass through the sealant region 58.

Figure 9:
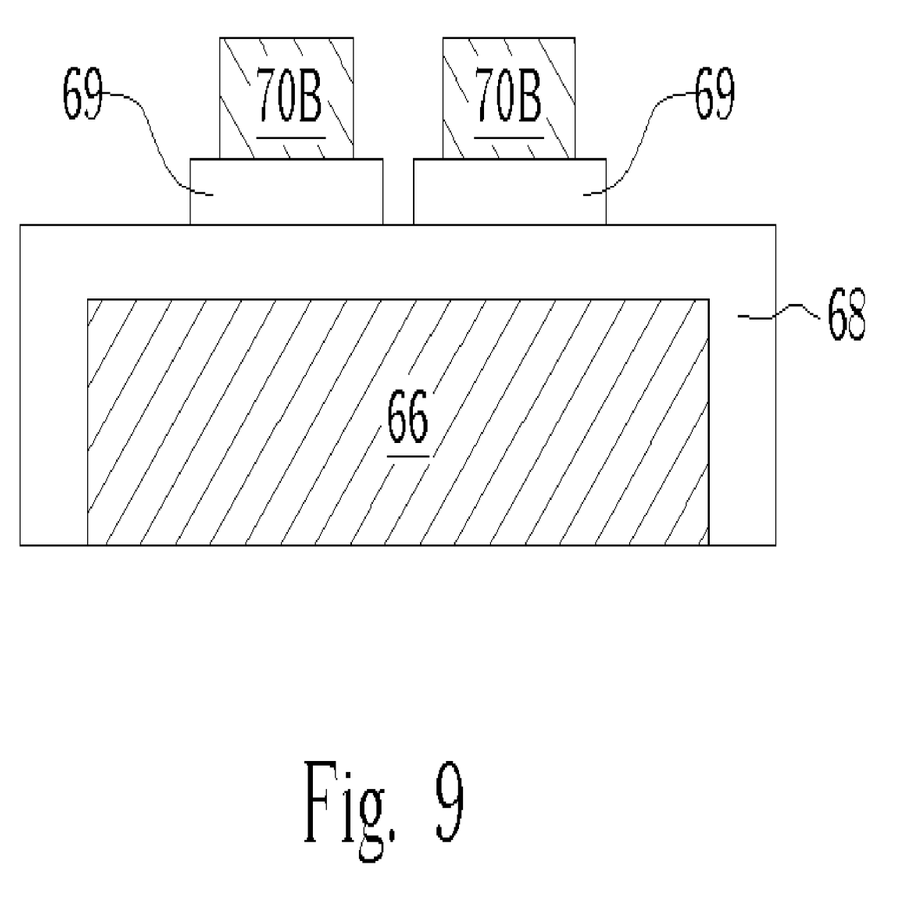
FIG. 9 is a schematic diagram of the ODF LCD panel of another embodiment according to the present invention.

Please refer to FIG. 9. FIG. 9 is a schematic diagram of the ODF LCD panel 50 according to another embodiment of the present invention. As shown in FIG. 9, the allocation of the first metal pattern 66, the insulating layer 68, and the second metal pattern 70 are similar to those shown in FIG. 8. The key difference is that at least a second insulating layer 69 is formed under the second metal pattern 70 for preventing a coupling effect between the first metal pattern 66 and the second metal pattern 70.

Figure 10:
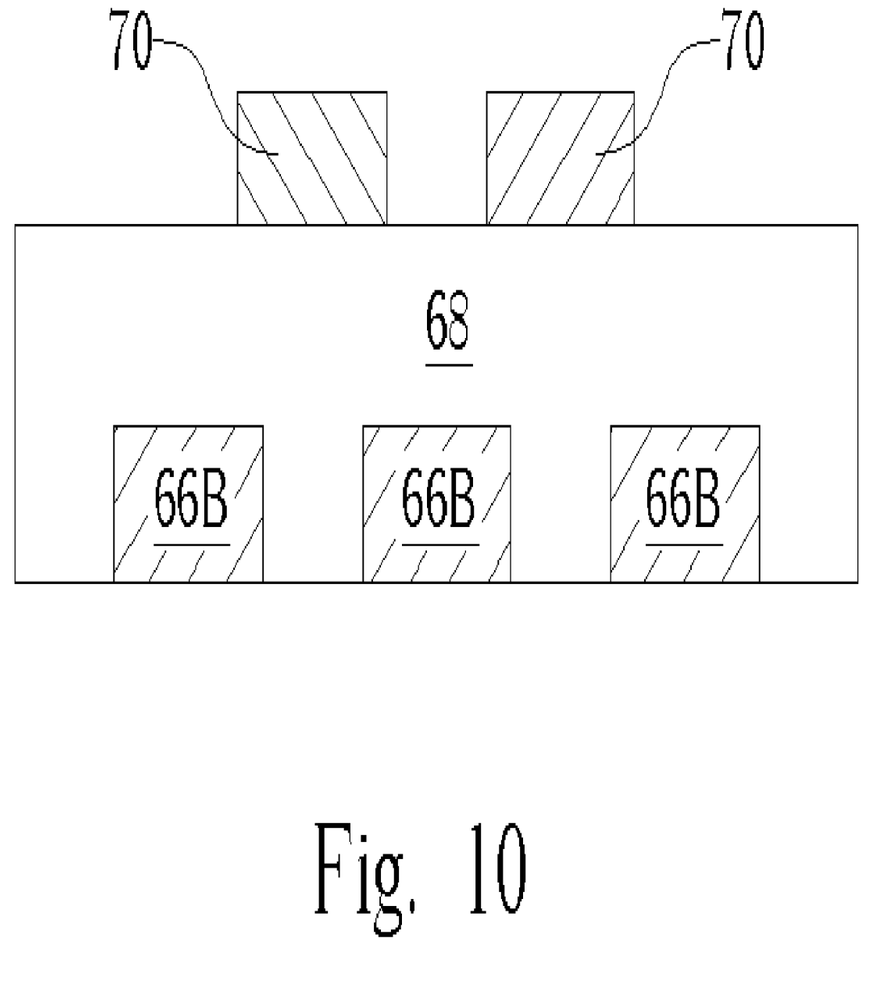
FIG. 10 is a schematic diagram of the ODF LCD panel of another embodiment according to the present invention.

Please refer to FIG. 10. FIG. 10 is a schematic diagram of the ODF LCD panel 50 according to another embodiment of the present invention. As shown in FIG. 10, the first metal pattern 66B and the second metal pattern 70 are arranged alternately. In this embodiment, the second metal pattern 70 only needs to be formed over the gap of the first metal pattern 66B, while the light-shielding effect is perfectly achieved.

In comparison with the prior art, the ODF LCD panel of the present invention comprises a first metal pattern and a second metal pattern in the sealant region. When the first metal pattern serves as metal conducting wires, the second metal pattern functions as a light-shielding pattern. On the other hand, when the second metal pattern serves as metal conducting wires, the first metal pattern functions as a light-shielding pattern. Therefore, the light provided by the light source of the back light module is not allowed to pass through the sealant region such that light leakage will not occur in the peripheral region of panel. In addition, since a black matrix layer is not installed in the CF substrate corresponding to the sealant region, the sealant can be completely hardened by the ultraviolet beam irradiating from the front side of the CF substrate. It is also worth noting that if the metal conducting wires are not required in a certain side of the sealant region according to different circuit design, only a single metal layer wider than the sealant region is enough to prevent from light leakage. Moreover, the single metal layer can either be formed in the process of forming the scan line or the data line.

Those skilled in the art will readily appreciate that numerous modifications and alterations of the device may be made without departing from the scope of the present invention. Accordingly, the above disclosure should be construed as limited only by the metes and bounds of the appended claims.

What is claimed is:

1. A one drop fill (ODF) liquid crystal display (LCD) panel comprising:
   a first substrate comprising:
     a pixel array region positioned on a central part of the first substrate, the pixel array region comprising a plurality of pixels, and each pixel including a thin film transistor (TFT);
     a sealant region positioned on a bordering part of the first substrate and surrounding the pixel array region; and
     a light-shielding pattern positioned on a surface of the sealant region, the light-shielding pattern comprising a first metal pattern, a second metal pattern, and a first insulating layer positioned between the first metal pattern and the second metal pattern;
   a second substrate;
   a sealant pattern positioned between the first substrate and the second substrate and corresponding to the sealant region for combining the first substrate with the second substrate; and
   a liquid crystal layer positioned between the first substrate and the second substrate;
   wherein when the first metal pattern is connected to a gate of the TFTs, the second metal pattern is used to prevent from light leakage through the first metal pattern, and when the second metal pattern is connected to a source or a drain of the TFTs, the first metal pattern is used to prevent from light leakage through the second metal pattern.

2. The ODF LCD panel of claim 1 wherein the sealant pattern comprises a photocuring sealant.

3. The ODF LCD panel of claim 1 wherein the first metal pattern and the second metal pattern further comprise at least a second insulating layer for preventing a coupling effect from occurring between the first metal pattern and the second metal pattern.

4. The ODF LCD panel of claim 1 wherein the sealant pattern is positioned in the sealant region of the first substrate.

5. The ODE LCD panel of claim 1 wherein the sealant pattern is positioned on a surface of the second substrate corresponding to the sealant region of the first substrate.

6. A display panel comprising:
   a first substrate comprising:
     a pixel array region positioned on a central part of the first substrate, the pixel array region comprising a plurality of pixels, and each pixel including a thin film transistor (TFT);
     a sealant region positioned on a bordering part of the first substrate and surrounding the pixel array region; and
     a light-shielding pattern positioned on a surface of the sealant region, the light-shielding pattern further comprising a first metal pattern and a second metal pattern;
   a second substrate; and
   a sealant pattern positioned between the first substrate and the second substrate and corresponding to the sealant region for combining the first substrate with the second, substrate; wherein when the first metal pattern is connected to a gate of the TFTs, the second metal pattern is used to prevent from light leakage through the first metal pattern, and when the second metal pattern is connected to a source or a drain of the TFTs, the first metal pattern is used to prevent from light leakage through the second metal pattern.

7. The display panel of claim 6 wherein the sealant pattern comprises a photocuring sealant.

8. The display panel of claim 6 wherein the first metal pattern and the second metal pattern further comprise at least an insulating layer for preventing a coupling effect from occurring between the first metal pattern and the second metal pattern.

9. The display panel of claim 6 wherein the display panel is a one drop fill (ODF) LCD panel.

10. The display panel of claim 6 wherein the sealant pattern is positioned in the sealant region of the first substrate.

11. The display panel of claim 6 wherein the sealant pattern is positioned on a surface of the second substrate corresponding to the sealant region of the first substrate.

* * * * *